UNITED STATES PATENT OFFICE 2,043,212

WELDING

Alwin Krauss, Frankfort-on-the-Main-Griesheim, Germany, assignor to I. G. Farbenindustrie Aktiengesellschaft, Frankfort-on-the-Main, Germany No Drawing. Application June 19, 1934, Serial No. 731,267. In Germany February 24, 1932

6 Claims. (Cl. 113—112)

The present invention relates to a welding process.

The oxyacetylene-flame is the hottest of all the flames hitherto used for welding. It is, therefore, the flame most commonly used for welding. The acetylene employed is prepared either from calcium carbide in an acetylene gas generator or it is supplied in the known steel containers in the form of dissolved acetylene. Both sources involve certain inconveniences which have also an economical disadvantage; furthermore, they may even involve danger. Several attempts have, therefore, already been made to replace the acetylene by other gases, for instance ethylene, or mixtures of gases. A particular object has been to find a gas which without any danger can be liquefied in steel bottles under a low pressure. Fuels which are liquid at ordinary temperature may likewise be used. Already for some time benzene has been used to a moderate extent for welding. The sphere of application of all these substitutes for acetylene is, however, limited on account of the low temperature of their flame.

The high flame temperature of the acetylene is a consequence of its high decomposition heat and of its triple carbon linkage. Other hydrocarbons with triple carbon linkage likewise often have a high decomposition heat and, therefore, permit the production of high flame temperatures. The present invention is accordingly based on the use of certain derivatives of acetylene instead of acetylene itself.

I have found that there may be used wholly or in part, as the fuel gas for producing the flame in a welding process, aliphatic acetlyene-hydrocarbons which contain several triple carbon linkages or contain besides one triple carbon linkage also a double carbon linkage. By using such a gas, there may be attained a flame temperature which reaches or even exceeds the flame temperature of acetylene, while the afore-named inconveniences of the acetylene are avoided.

The following three examples may be cited for illustrating the possibilities if hydrocarbons of the characterized kind are used:

(1) Vinyl-acetylene $C_4H_4$ ($CH \equiv C—CH=CH_2$) a polymerization product of acetylene, has a higher decomposition heat and only a slightly lower flame temperature than acetylene. It boils at $+5°$ C.

(2) Diacetylene $C_4H_2$ ($CH \equiv C—C \equiv CH$) has a decomposition heat which is more than twice as great as that of acetylene and a considerably higher flame temperature than acetylene. It boils at $+10°$ C.

(3) The pentadiines $C_5H_4$ ($CH \equiv C—CH_2—C \equiv CH$ or $CH \equiv C—C \equiv C—CH_3$) likewise have a very high decomposition heat and about the same flame temperature as acetylene. They are liquid at room temperature, but can easily be gasified on account of their high vapor pressure.

It is, of course, also possible to use mixtures of the afore-named hydrocarbons either with one another or with other fuels.

The present invention renders it possible to combine the advantage of a high flame temperature on the one hand with favorable physical properties of the fuel on the other hand by using a certain group of hydrocarbons as fuel gases. The superiority of the acetylene in comparison with other hydrocarbons is chiefly based on its high decomposition heat. Owing to this high decomposition heat there is liberated such a quantity of heat in the first stage of the reaction with oxygen which leads to hydrogen and carbon monoxide that the resulting gases are brought to a high temperature. Hydrogen and carbon monoxide dissociate only with difficulty; the reaction with oxygen may, consequently be complete even at a high temperature. Contrary thereto, other gases, notwithstanding that they may have a high heat of combustion cannot yield such hot flames, because the combustion to produce water vapor and carbon dioxide no longer takes place at a high temperature and the total available heat energy is consequently, not liberated. Most hydrocarbons including those best known, yield only a small heat energy in the first stage, because they dissociate with a small evolution of heat, in some cases even only with consumption of heat furnished by the combustion of carbon to carbon monoxide.

The homologues of acetylene have hitherto not been used for welding and they are by no means directly suitable for this purpose. The use of allylene $C_3H_4$ ($CH \equiv C—CH_3$) has once been considered; it has, however, been found by calculation that in respect of its flame temperature it is considerably inferior to acetylene. The calculated result has been confirmed by experiments. The same holds true also with regard to the next homologues ethyl-acetylene, propyl-acetylene, or the like.

I claim:

1. In the autogenous welding of metals, the new step which comprises using as a fuel an acetylene hydrocarbon of the group consisting of the gaseous and easily vaporized aliphatic acetylene hydrocarbons having in their molecule a multiple bond besides the triple bond of the acetylene residue.

2. In the autogenous welding of metals, the new step which comprises using as a fuel an acetylene hydrocarbon of the group consisting of the gaseous and easily vaporized aliphatic acetylene hydrocarbons having in their molecule a double bond besides the triple bond of the acetylene residue.

3. In the autogenous welding of metals, the new step which comprises using as a fuel a mixture of the acetylene hydrocarbons of the group consisting of the gaseous and easily vaporized aliphatic acetylene hydrocarbons having in their molecule a multiple bond besides the triple bond of the acetylene residue.

4. In the autogenous welding of metals, the new step which comprises using as a fuel vinyl-acetylene.

5. In the autogenous welding of metals, the new step which comprises using as a fuel diacetylene.

6. In the autogenous welding of metals the new step which comprises using as a fuel pentadiines.

ALWIN KRAUSS.